United States Patent Office 3,776,813
Patented Dec. 4, 1973

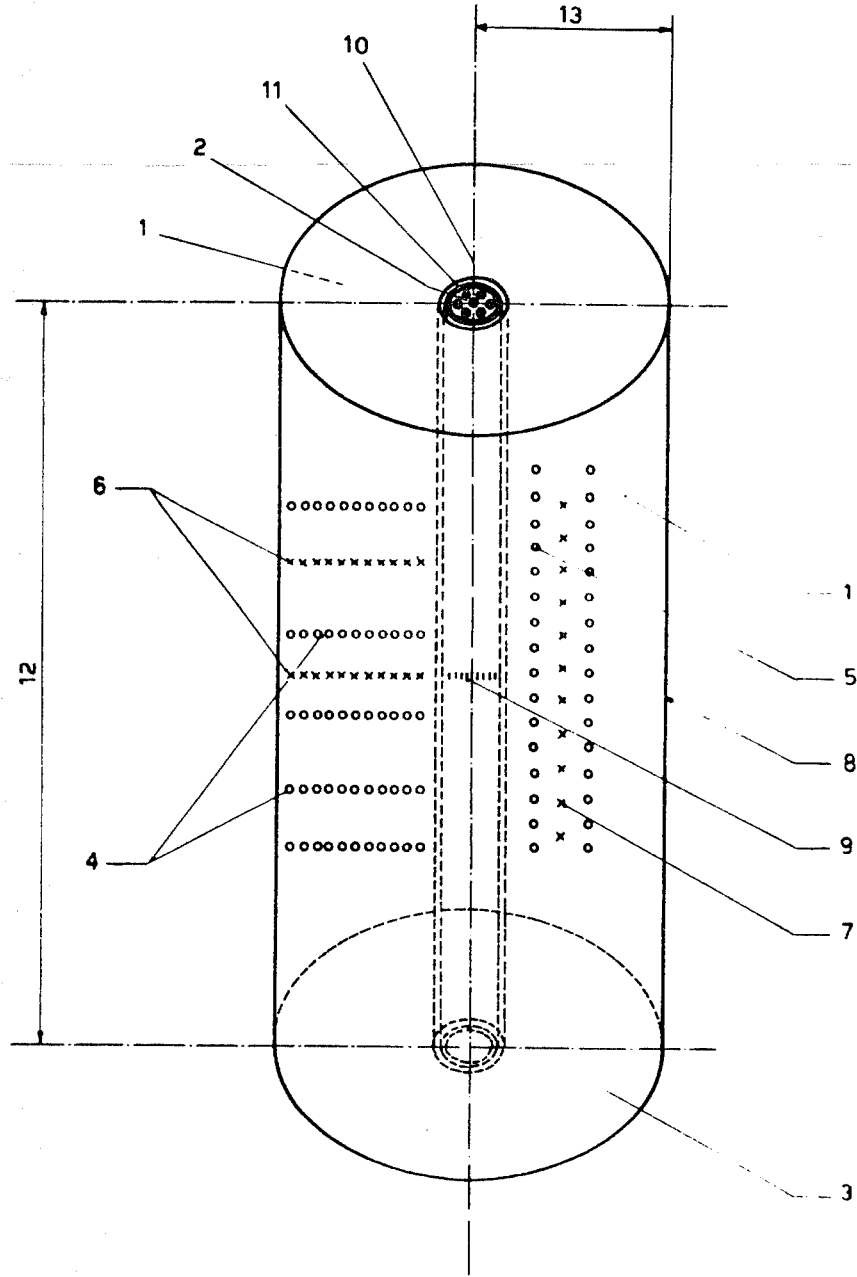

3,776,813
METHOD TO DETERMINE THE NEUTRON ABSORPTION AND MULTIPLICATION PARAMETERS FOR CLUSTER-TYPE NUCLEAR FUEL ELEMENTS
Silvio E. Corno, San Donato Milanese, Italy, assignor to Snam Progetti S.p.A. L.R.S.R-Brevetti, Milan, Italy
Filed June 26, 1969, Ser. No. 836,882
Claims priority, application Italy, July 4, 1968, 18,561/68
Int. Cl. G21c 17/00
U.S. Cl. 176—19 R                                     8 Claims

ABSTRACT OF THE DISCLOSURE

The neutron absorption and multiplication parameters are determined for heavy water ($D_2O$) or graphite moderated heterogeneous power reactors by irradiating a single fuel element cluster positioned along the longitudinal axis of a given column of moderator and taking neutron flux measurements at suitable radial and axial positions. The critical dimensions and power distribution for a heterogeneous core made up of a plurality of fuel element clusters of the type irradiated are derived from the neutron flux measurements by means of the so-called "source-sink" heterogeneous reactor theory.

---

The present invention refers to the setting up of a new procedure for determining the neutron thermal and epithermal absorption and multiplication parameters for cluster-type nuclear fuel elements. This procedure requires the use of a single cluster, to be inserted along the axis of a cylindrical column of moderator, which is irradiated by a neutron source, located on one of its bases.

The aforementioned neutron absorption and multiplication parameters can be ascertained, according to the present procedure by means of suitable mathematical formulas from experimental neutron flux measurements performed in the moderator, and can be used within the framework of standard, or suitably modified, heterogeneous theories of nuclear reactors to make accurate determinations of criticality for $D_2O$ or graphite moderated cores.

A surprising advantage of the invention is the following: reliable estimates of the critical state for cluster fueled heterogeneous reactors can be performed by making use of an experimental device in which only a segment of the fuel cluster under examination needs to be inserted in the reactor core and irradiated. As a consequence, the present invention provides an exceptionally inexpensive and particularly apt technique for studying lattices made of high cost fuel elements, such as those bearing plutonium or $U^{233}$.

In heavy water ($D_2O$) or graphite moderated reactors, large fuel elements are actually employed, which are constituted by bundles of small rods of fissile material either in the form of pure metal, or sometimes, oxide and carbide. The small rods (fuel pencils) are singularly cladded, slightly spaced from one another, and all enclosed within a so-called "calandria tube."

In other cases the elementary fuel units are constituted by coaxial, singularly cladded tubes of fissile material, in the form of metal, oxide, or carbide, as the case might be. All these fuel elements, within which, as a rule, a cooling fluid is flowing under operating conditions, are of quite large dimensions, i.e. external diameters of the order of 10–20 cm., and lengths of several meters. I shall briefly designate them by the word "clusters."

As far as the neutron balance is concerned, in the dimensioning of the $D_2O$ or graphite moderated power reactors, in which clusters are employed, the following experimental techniques are currently being used:

(1) *Critical experiments at zero power.* These employ a full scale simulation of the multiplying system, including the complete critical mass.
(2) *Exponential experiments.* A considerable fraction of the critical mass is required.
(3) *The progressive substitution method* and
(4) *PCTR* (Physical Constants Testing Reactor).

Both of the last techniques require an auxiliary critical reactor and may sometimes produce results whose interpretation and extrapolation to the full scale reactor is not always reliable or is subject to ambiguities. This is especially true when structures with extremely large lattice pitches are to be dealt with.

The main disadvantages of the conventional procedures may be summarized as follows:

(1) They always require the use of a large number of fuel elements or, when a few of them (but rarely less than a tenth, say) are utilized, expensive and sophisticated auxiliary reactors are needed.

(2) The personnel requirements for performing a single experimental cycle are, as a rule, rather heavy, and the execution times may be rather long.

(3) The methods listed under the headings 2, 3 and 4 hereinabove are not well suited for investigating lattices in which the fuel elements may not be equal to one another. When fuel materials not readily available are to be dealt with, there is no advisable conventional method.

The results of the experimental measurements actually performed according to the aforementional conventional procedures are correlated to theoretical models in order to obtain either the local or the global multiplying properties of the examined structures. For the above mentioned conventional techniques, one can derive respectively:

(1) The effective multiplication constant, $k_{eff}$;

(2) The material buckling $B^2$ of the examined lattice, where, by definition $B^2 = (K\infty - 1)/M^2$, $K\infty$ being the infinite medium multiplication constants and $M^2$ the neutron migration area;

(3) The buckling difference $\Delta B^2$ between the reference zone and the substituted region; and (4) The multiplication constant $K\infty$ of the medium, its spatial extension being assumed to be infinitely large.

The above mentioned neutron multiplication parameters are then used within a conceptual framework based on the concept of an "homogeneous structure, equivalent to that being examined." The formalism leads, as a final result, to estimations of critical dimensions and homogenized power distribtuions, for structures constituted by the same multiplying media as those on which experiments mentioned under headings (2), (3) and (4) have been performed.

From the first conventional method mentioned hereinabove, any desired result comes out quite obviously, but its total cost is extremely high.

As far as the problem of dimensioning of the heterogeneous multiplying structures is concerned, a completely different approach has also been considered, which is based on the so-called *"source-sink"* or *"small source"* method for heterogeneous reactor calculation.

This method is a purely theoretical one and can be applied once the heterogeneous neutron absorption and multiplication parameters, which characterize each fuel cluster, are known. But these heterogeneous parameters for the fuel elements are still derived either from theoretical estimates (and this procedure implies that experimental checks of the same type as those listed above have to be performed later on) or they are directly derived from the classical experiments just described. As a consequence, in the actual situation, the role of the source-sink methods is restricted to supplying us with more detailed information about the space and energy dependent neutron distribution within the reactor cores, while they do not guarantee any appreciable saving in time and money, due to the expensive experimental facilities and procedures which still seem to be required in dimensioning reactors with large clusters.

In the past some attempts have been made in order to determine directly the heterogeneous neutron absorption and multiplication parameters of the clusters, starting from experimental devices indicating the use of a single fuel element embedded in a moderating column. No satisfactory results, however, have been derived from these experiments, probably because of both the inadequate theoretical investigation and the limited accuracy in the measurements. As a matter of fact the determination of the neutron multiplication constant, which is by far the most important one, has not been attempted, while the measurements of the thermal neutron absorption proved to be practically useless, being dissociated from the corresponding multiplying constant.

The fundamental object of the present invention therefore is to provide a new and improved technique for the accurate determination of thermal and epithermal neutron absorption as well as multiplication parameters, for cluster-type nuclear fuel elements.

The method of the present invention requires only the use of a segment of the cluster to be examined, never longer than about 2.5 meters, which is inserted along the axis of a cylindrical column of moderator.

Such a column is irradiated on one of its bases by means of a plane neutron source of any energy, with an arbitrary radial shape, but preferably possessing circular symmetry around the center of the base itself.

The radius of the experimental column is chosen in each case according to a criterion of optimization for the experiment, depending upon the accuracy of the measurement that is desired. In particular cases the possibility of using, for a given cluster, two or more columns of different radii is also contemplated by the invention. This is done in order to establish the influence of the neutron energy spectrum, which is present on an ideal cylindrical surface coaxial to the fuel element, whose radius is of the order of 15–20 cm., on the derived values of the parameters. When a procedure of this kind is adopted the cluster can be described within an oversimplified two-parameters (i.e. the thermal absorption and the overall multiplication constant) scheme, without any loss of information as far as the subsequent criticality calculation is concerned.

Obviously the best choice to be made for the moderator of the experimental column is that it be the same as the moderator that will be used in the full scale core. Nevertheless, differential effects can be investigated also in columns made of different moderators.

From the experimental point of view the method which is the object of the present invention requires only conventional measurements of thermal and epithermal neutron fluxes inside the moderator (together with the determination of a few spectral indices in well defined spatial points), in order to produce a flux mapping of the thermal and epicadmium neutron population as complete as possible within the column. In practice the detectors are located at several points along preassigned radial straight lines, as well as at points along axial lines parallel to the axis of the cluster.

In particular cases the method may require measurements of the initial conversion ratio, to be performed, by means of uranium detectors, inside as well as outside the fuel, along a radial line extending in a plane, parallel to the base of the column, and located quite far away from the source plane.

By interpolating the experimental flux measurements by means of theoretical formulas, such as those set forth hereinafter, which express the solution to the system of two (or more) coupled integro-differential equations describing the thermal and epithermal fluxes in the moderator, the following parameters can be determined for any cluster:

(1) *The multiplying property of the cluster*, which will be designated by $\eta$, and is defined as the number of fast neutrons emitted by the cluster as a consequence of the capture of a single thermal neutron.

(2) *The absorption property of the cluster for thermal neutrons*, which will be designated by $\gamma$. It is defined as the ratio between the total current of thermal neutrons entering the cluster and the thermal neutron flux, as extrapolated to the contour of the cluster itself. This definition can obviously be extended, for instance, to the contour of an empty channel, in which the cluster could eventually be included.

(3) *The epithermal neutron absorption parameter*, $\gamma_{ep}$, defined as the ratio between the conversion factor in the fuel and the value of the average flux in the interval 6.0–200. ev., radially extrapolated from the moderator to the contour of the cluster. The direct measurement of this parameter turns out to be immaterial if both the previously defined parameters are taken as "functionals" of the neutron energy spectrum of the flux as measured at a given distance (e.g. 15–20 cm.,) from the axis of the fuel cluster.

It has to be explicitly pointed out that both of the absorption properties defined above could also be referenced to any given cylindrical surface which is, coaxial to the fuel cluster and has a thermal neutron mean free path slightly larger than the cluster itself.

The knowledge of the parameters listed above can be used to determine, by means of the standard or slightly improved procedure of the "small source theory" or "heterogeneous method," the critical dimensions or the effective multiplication constant for a structure constituted by a plurality of fuel element clusters identical to that examined.

The final information which can be derived from the present invention can be obtained with the same degree of accuracy as from the conventional methods, for which much higher expenditures are required.

In order to provide a clearer understanding of the present invention, it will now be described, with particular reference to the annexed drawing.

The experimental device, used in the procedure which constitutes the object of the present invention, is schematically shown in the accompanying drawing, which is intended to be exemplary and explanatory of the invention, and not restrictive thereof.

Referring now more particularly to the accompanying drawing, there is illustrated a cylindrical column of moderating material, for example graphite or heavy water ($D_2O$), denoted by reference numeral 1, suitably surrounded by a thin cadmium layer 8, designed to prevent the lateral leakage of thermal neutrons and to return them to the central portion of the column.

The present invention can also be realized by using prismatic columns of regular cross sections, for instance octagonal or hexagonal.

The fuel cluster 2 to be examined is inserted along the axis 10 of column 1. It fills either completely or partially a fuel channel 11 identical to that foreseen in the actual core design.

From the lower base 3 of the column are injected the source neutrons, which advantageously are emitted from the outer face of a thermal column in a research reactor (not shown).

In each of the positions referred to at 4 there is located a conventional thermal neutron detector, and from these detectors the radial flux mapping can be easily derived.

In the positions indicated by reference numeral 5 there are also located conventional thermal neutron detectors advantageously of the same type as located at 4, from which the axial behaviour of the thermal flux is ascertained.

In positions such as 6 and 7, respectively, there are located epithermal conventional flux detectors, or those measuring the conversion ratios, to be plotted along a radial line inside the moderator.

In positions 9 may eventually be located suitable uranium detectors for the measurement of the spatial average of the (initial) conversion ratio inside the cluster, by means of conventional techniques. The mutual positions of the detectors as well as their number illustrated in the accompanying drawing, are to be taken as exemplary only. The axial dimension 12 of the experimental column may fall in the range of 2–3 meters. The radial dimension 13 is preferably chosen after the cluster to be examined has been ascertained, according to either an optimization criterion, established for improving the sensitivity of the experiment, or in order to produce, on an ideal cylindrical surface, whose radius is about 15–20 cm., coaxial to the cluster, any desired spectral condition.

Useful values of the radius range from a minimum of about 35 cm. for $D_2O$, up to a maximum of about 100–110 cm. for graphite.

From the experimental point of view the operating procedure of the present invention consists of the following steps:

(1) The base 3 of the experimental column is exposed to a neutron source, for example, by removing, a thermal neutron shutter, interposed between the external surface of a thermal column of a research reactor and the base of the experimental column. All detectors, or part of them, are assumed to be located in position such as 4, 5, 6, 7 and 9.

(2) The irradiating source is kept as constant as possible for a time interval of sufficient duration to bring all detectors located in the region actually being investigated to their saturation activity or to a constant response. This guarantees in particular that the rate of production of delayed neutrons in the cluster has reached its equilibrium value during the useful portion of the irradiation. As a consequence, one of the possible sources of systematic error in the evaluation of absorption and multiplication parameters is removed.

(3) From the detector signals or activations the values of the neutron fluxes at all investigated points inside the moderator are derived, and, eventually, the conversion factors both outside and inside the fuel.

(4) After introducing the numerical values of the fluxes as input in the numerical codes for the interpolation, one derives directly, for the examined cluster, the multiplication and absorption parameters defined above, by doing a few minutes run on an average power computer.

The inventive concept of the present method essentially consists of (i) deriving the requested experimental data as described above and (ii) applying to them a mathematical correlation procedure of the same type as that which will be sketched hereafter, the mathematical correlation being selected so as to derive those values of the absorption and multiplication parameters of the cluster, whose determination constitutes the fundamental object of the present invention.

Thus, $r_k$ and $z_k$ respectively, denote the distances from the axis of the column and the source plane of the $k^{th}$ point, $P_k$ in the moderator, in which the flux is to be measured.

For the sake of clarity the simple case in which only $\eta$ and $\gamma$ are to be determined shall be considered.

Theoretical procedures, based on some more or less sophisticated approximation of the solution to the Boltzman neutron transport equation inside the moderating region, permits one to calculate the expectation value of the thermal neutron flux in any space point $P_k$, once the heterogeneous parameters $\eta$ and $\gamma$ of the fuel, together with the radial shape and the spectrum of the driving source, have been assigned.

Thus, $\Phi_k(\eta, \gamma)$ denote the theoretical flux, as evaluated at the space point $P_k$, apart from a constant normalization factor A. The experimental flux, measured in the same space point $P_k$, is designated by $\varphi_k$.

In the method of the present invention values for the parameters $\eta$ and $\gamma$ are initially assumed, from which the expected values for the thermal flux $\Phi_k(\eta, \gamma)$ are computed, for all points where measurements are being performed.

It may happen that, depending on the different degrees of accuracy with which the flux measurements have been performed, the distance between the theoretical and experimental values of the flux should be weighted by suitable constants $w_k > 0$. As a consequence, the total quadratic error between the theoretical and the experimental flux is conventionally defined by means of the formula:

$$E^2 \equiv E^2(\eta, \gamma) = \sum_k w_k \cdot [\varphi_k - A \cdot \Phi_k(\eta, \gamma)]^2 \quad (1)$$

the summation extending to all measurements performed. First of all the constant A is determined, for each choice of $\eta$ and $\gamma$, by simply minimizing $E^2$. The result is as follows:

$$A \equiv A(\eta, \gamma) = \frac{\sum_l w_l \cdot \varphi_l \cdot \Phi_l(\eta, \gamma)}{\sum_m w_m \Phi_m^2(\eta, \gamma)} \quad (1')$$

After introducing (1') in (1) it becomes self evident that $E^2$ depends exclusively on $\eta$ and $\gamma$.

In the instant technique, by means of a suitably designed iteration scheme, the values of $\eta$ and $\gamma$, which satisfy the equation $$E^2(\eta, \gamma) = \text{MINIMUM} \quad (2)$$

are automatically determined.

These values of $\eta$ and $\gamma$ can be considered as the best ones for describing, within the scheme of heterogeneous reactor theories, the thermal absorption and overall multiplication properties of the cluster, provided that the energy spectrum of the neutron field, in which the fuel element is embedded under experimental conditions, is not dissimilar from the one which is actually to be found in the reactor lattice.

This condition can be fulfilled by using, on the one hand, an appropriate iteration procedure when calculating the critical dimensions of a multiplying structure, starting firom the $\eta$'s and $\gamma$'s of the clusters, which will constitute the structure itself, and, on the other hand, by repeating the experiment in columns of different radii. As a matter of fact, it is possible to create different spectral situations on the ideal cylindrical surface coaxial to the cluster and distant from its contour some 15–20 cm.

Obviously for each spectral situation the corresponding values of $\eta$ and $\gamma$ will be determined, by means of the above mentioned procedure. By means of a successive approximation techniques, in the calculation of a given heterogeneous core, a *self consistent critical configuration* will be determined. This is a configuration in which all clusters are described by values of $\eta$ and $\gamma$ which are strictly pertinent to each particular cluster, attention being paid to the average spectral situation which is present in the critical core at a distance of about 15–20 cm. from each cluster boundary.

It is now easily understandable how, according to the present scheme, a given cluster happens to be characterized by different values of $\eta$ and $\gamma$, depending on which spatial position it is going to occupy within the critical structure.

By way of example, the theoretical formula which expresses $\Phi_k(\eta,\gamma)$, is applied hereinafter in the particular case in which the neutron slowing down is described by the Fermi Age theory, and, for the diffusion of thermal neutrons inside the moderator, one group diffusion theory can be taken as sufficiently accurate.

The cluster will be schematically represented as hereafter illustrated.

One assumes that all thermal neutron absorptions occur on a virtual surface of radius "$a$" equal to or larger than the actual radius of the cluster. This surface is considered to be embedded in a continuous moderator.

Fission neutrons, are assumed to be emitted from another cylindrical surface, coaxial to the cluster, whose radius is called $e \leqslant a$.

Under these conditions, and assuming, for the sake of simplicity, that the axial extent of the column is infinite, one derives:

$$\Phi_k(\eta, \gamma) = \sqrt{\frac{2}{\pi}} \cdot \int_0^\infty \frac{\varphi_F{}^S(a, \xi)}{\Psi(\eta, \gamma; \xi)} \Gamma(\gamma; \xi)$$
$$\cdot \{\eta \cdot e^{-\xi^2 \tau} \cdot [1 + E^*(\eta; \xi)] \cdot F(e \to r_k; \xi)$$
$$- K(\eta, \gamma; i\mu_1{}^0) \cdot [1 + Y \cdot E^*(\eta, \xi)] \cdot G(a \to r_k; \xi)\}$$
$$\cdot \cos(\xi z_k) \cdot d\xi + \varphi^S(r_k, z_k) \quad (3)$$

where the meaning of the symbols is as follows:

$\varphi^S(r_k, z_k) \equiv$ The thermal flux, which would be present at $P_k$ in the moderator, as a consequence of the presence of the external source alone, if the fuel cluster were removed and the gap filled by pure moderator; $\varphi_F{}^S(r_k, \xi)$ is the Fourier transform of this function, taken with respect to the axial variable $z$.

$\Gamma(\gamma;\xi) \equiv \gamma - S_c \cdot D_{||} \cdot f \cdot \xi^2$, $S_c$ being the geometrical cross section of the cluster, [cm.$^2$], $D_{||}$ the axial diffusion coefficient for thermal neutrons inside the cluster; $f$ represents the disadvantage factor of the cluster for thermal neutrons: its value can be measured experimentally or calculated. Only a rough approximation is required. For the value of $D_{||}$ too, only a first approximation is required.

$\tau \equiv$ Fermi Age to thermal for fission neutron emitted in the moderator by the cluster.

$$E^*(\eta; \xi) \equiv \eta \cdot e^{-\xi^2 \tau} \cdot X/(1 - \eta \cdot X \cdot e^{\xi^2 \tau})$$

X being a constant, related to the probability for fission neutrons of slowing down inside the cluster, the slowing down being caused by light atoms eventually admixed to the fuel, for instance as part of a coolant. Y occuring in Formula 3 is a constant too. Furthermore:

$$F(e \to r_k; \xi) \equiv \frac{1}{\pi R^2 D} \sum_{1j}^{\infty} \frac{e^{-\left(\frac{\alpha_j}{R}\right)^2 \tau} \cdot J_0\left(\frac{\alpha_j}{R} e\right) \cdot J_0\left(\frac{\alpha_j}{R} r_k\right)}{\left[\left(\frac{\alpha_j}{R}\right)^2 + \frac{1}{L^2} + \xi^2\right] \cdot [J_1(\alpha_j)]^2}$$
(4)

R being the extrapolated radius of the experimental column;
D the diffusion coefficient for thermal neutrons in the moderator;
L their diffusion length;
$J_0$ and $J_1$ Bessel functions of the first kind, of order 0 and 1 respectively.
The $\alpha_j$'s are the successive roots of the equation $J_0(x) = 0$.

$$G(a \to r_k; \xi) \equiv \frac{1}{2\pi D} \cdot I_0(\omega a) \cdot \left[K_0(\omega r_k) - \frac{K_0(\omega R)}{I_0(\omega R)} \cdot I_0(\omega r_k)\right]$$
(5)

Where $$\omega \equiv \sqrt{\frac{1}{L^2} + \xi^2}$$

$I_0$ and $K_0$ are Bessel functions of the second kind and order zero.
$K(\eta, \gamma; i\mu_1{}^0)$ is a function (depending parametrically on $\gamma$ and $\eta$) of the value of the first purely imaginary root $\xi = i\mu_1{}^0$ of the function $\Psi(\eta, \gamma; \xi) = 0$. $\Psi$ is taken as a function of the complex variable $\xi = \lambda + i\mu$, and its explicit expression contains $K(\eta, \gamma; i\mu_1{}^0)$ itself. By definition:

$$\Psi(\eta, \gamma; \xi) \equiv 1 - \Gamma(\gamma; \xi)\{\eta \cdot e^{-\xi^2 \tau}[1 + E^*] \cdot F(e \to a; \xi) - K \cdot [1 + Y \cdot E^*] \cdot G(a \to a; \xi)\}$$
(6)

while K, for purely imaginary values of $\xi$ is expressed by $$K(\eta, \gamma; i\mu) \equiv \eta \frac{[1 + E^*(\eta; i\mu)]\{\overline{\Gamma}(\gamma; i\mu)[1 + Y \cdot E^*(\eta; i\mu)] \cdot F(e \to a; i\mu) - F^*\}}{[1 + Y \cdot E^*(\eta; i\mu)]\{\overline{\Gamma}(\gamma; i\mu)[1 + Y \cdot E^*(\eta; i\mu)] \cdot G(a \to a; i\mu) - G^*\}} \quad (7)$$

The symbols $F^*$, $\overline{\Gamma}$ and $G^*$ being defined by $$F^* \equiv 2\pi D \cdot a \cdot e^{+\mu^2 \tau} \cdot \left[\frac{\partial F(e \to r; i\mu)}{\partial r}\right]_{r=a+0};$$

$$\overline{\Gamma} \equiv \Gamma \cdot e^{\mu^2 \tau}$$

$$G^* \equiv 2\pi D \cdot a \left[\frac{\partial G(a \to r; i\mu)}{\partial r}\right]_{r=a+0}.$$

Of course the procedure described above is not the only one which allows us to obtain the solution of the technical problem which represents the object of the present invention.

Multigroup theories or approximations to Boltzmann equations of many other types, including asymptotic expansion of the fluxes for $z \to \infty$, can be used as well.

In the more general case, where the epithermal flux distribution $\Phi_{ep,k}(\eta,\gamma;\tau_{ep})$ is accounted for at all ages $\tau_{ep} < \tau$, the correlation of the conversion factors is carried out by means of a representation of the above mentioned epithermal flux of the following type:

$$\Phi_{ep, k}(\eta, \gamma; \tau_{ep}) = \eta \cdot \frac{1}{(\xi^* \Sigma_1)^M} \qquad g(r_k) \cdot \sqrt{\frac{2}{\pi}} \cdot \int_0^\infty \frac{\varphi_F{}^\xi(a, \xi) \cdot \Gamma(\gamma; \xi) e^{-\xi^2 \tau_{ep}} \cdot \cos(\xi z_k)}{\Psi(\eta, \gamma; \xi) \cdot [1 - \eta \cdot X \cdot e^{-\xi^2 \tau}]} d\xi$$

and the procedure may be appropriately generalized to that of the above mentioned one.

An alternative to the present experimental procedure consists of compensating, by means of the insertion of a thermal neutron poison, the increase of the axial neutron conductivity along the column, which is due to the presence of the cluster. The poison, having preferably a capture cross section of the "1/v" type, may be:

(1) homogeneously distributed in the moderator;
(2) insert in the channel 11 between moderator and fuel; or
(3) distributed in the internal cavities of the cluster.

In any case the presence of the poison acts in such a way that the axial relaxation constant of the fundamental harmonic of the thermal radial flux in the poisoned device decays along the Z axis according to the same law with which the neutron flux caused by the external source would decay in the moderator column, when the latter is not poisoned and deprived of the cluster.

In this case the correlation technique of the experiment is an obvious generalization of the above mentioned procedure.

Many variations to the correlation techniques of the experiment will be obvious for the experts in the art. All these variations arise directly from the method of the present invention.

The time required for an operation like the above mentioned one may be reduced to less than 10 working days and engages only two technicians and one engineer. Many short unit-times may be obtained for routine works, carried out in series.

The main advantages of the method, according to the present invention, are the following:

(1) Low costs; both for personnel and equipment expenses, and, above all, because one needs only a segment of the cluster to be examined;

(2) Short response times;

(3) The possibility of utilizing vast works of comparative analysis on different types of fuel elements. The method is particularly suitable for the study of clusters which are very expensive or difficult to produce, e.g., the ones containing plutonium and $U^{233}$.

(4) As it is used in connection with heterogeneous calculations of criticality, it is particularly useful also to the study of irregular lattices, this study being very expensive if effected by conventional methods, in particular in the case of systems containing the so-called "spikes" (i.e. more enriched fuel elements) or elements of different structure, superimposed on a uniform multiplying lattice. This is particularly important, for example, for reactors having a cycle of nuclear overheating of the coolant.

(5) Owing to the small quantity of fuel required, the method may be applied to previously irradiated fuel elements.

(6) It may be useful to the study of the neutronic equivalence among clusters of different type. For example, for reactors initially charged with natural or enriched uranium, it may be interesting to foresee the subsequent use of mixed U-Pu clusters. By making use of the present method it is possible to solve the following problems in connection with the recycle of Pu in the thermal reactors:

(a) to establish particular concentrations and particular spatial distributions of Pu in a cluster which will obtain a neutron behaviour similar to that of the element having U in the initial charge;

(b) to determine what must be the optimum distribution of Pu in the clusters in order to minimize the positive effect of temperature (see also item 7) of Pu.

(7) It is capable of determining the temperature coefficient of the fuel and of the coolant-moderator inside it. Moreover the method, with few additional difficulties, also is capable of measuring the temperature coefficient (which is normally delayed in heterogeneous reactors) of the main moderator.

(8) The method is particularly suitable for studying of the void coefficient of the internal coolant and estimating the efficiency of the burnable poisons at different concentration and various distributions in the system.

(9) A rougher version of the present technique may be used to determine the neutron absorption of the control rods.

Although the present invention has been described in connection with a particular embodiment illustrated in the drawing, the inventive concept is susceptible of numerous other applications which will occur to people skilled in the art.

The invention in its broader aspects is not limited to the specific embodiment herein shown and described but departures may be made therefrom within the scope of the accompanying claims, without departing from the principles of the invention and without sacrificing its chief advantages.

What is claimed is:

1. An experimental method for determining the neutron absorption and multiplication parameters which characterize a cluster-type fuel element for use in heavy water ($D_2O$) and graphite-moderated heterogeneous nuclear reactors, comprising the steps of:

providing a column of moderating material;
inserting a single nuclear fuel element cluster along the axis of said column of moderating material, said single nuclear fuel element cluster having the same composition as that of the fuel element clusters of the reactor for which said parameters are to be experimentally determined;
locating a plane source of neutrons at the base of said column of moderating material;
irradiating said nuclear fuel element cluster within said column of moderating material with said plane source of neutrons;
measuring the thermal neutron flux within said column of moderating material both axially and radially thereof; and
measuring the epithermal neutron flux within said column of moderating material both axially and radially thereof; and
substituting the measured neutron flux values in suitable mathematical formulas to thereby calculate the corresponding values for the neutron absorption and multiplication parameters.

2. A method as claimed in claim 1, wherein said column of moderating material is provided in a cylindrical configuration.

3. A method as claimed in claim 1, wherein said column of moderating material is provided in a prismatic cross-sectional configuration.

4. A method as claimed in claim 1, including the steps of:

providing said column of moderating material with an axially-extending channel generally centrally thereof; and
inserting said nuclear fuel element cluster into said channel for irradiation by said neutron source.

5. The method as claimed in claim 1, wherein said moderating material has the same composition as that of the reactor for which said parameters are to be experimentally determined.

6. The method as claimed in claim 1, including the step of:

measuring the spatial average of the initial conversion ratio both inside and outside of said nuclear fuel element cluster along a radial line remote from said neutron source.

7. The method as claimed in claim 1, including the step of:

maintaining the temperature of at least one of said nuclear fuel element cluster and said column of moderating material at a value different from that of room temperature, to thereby detect effects of temperature on said parameters.

8. The method as claimed in claim 1, including the step of:

introducing a homogeneous neutron poisoning material to said column of moderating material, to thereby deduce the neutron multiplication of said fuel element cluster.

References Cited

UNITED STATES PATENTS

| | | | |
|---|---|---|---|
| 2,780,595 | 2/1957 | Fermi | 176—19 |
| 3,042,803 | 7/1962 | Martelly | 250—83.1 |
| 3,043,954 | 7/1962 | Boyd et al. | 250—83.1 |
| 3,222,521 | 12/1965 | Einfeld | 250—83.1 |
| 3,436,538 | 4/1969 | Basdekas | 250—83.1 |
| 3,496,357 | 2/1970 | Weinzierl et al. | 250—83.1 |

REUBEN EPSTEIN, Primary Examiner